United States Patent
Abad et al.

(10) Patent No.: US 9,140,107 B2
(45) Date of Patent: Sep. 22, 2015

(54) DOWNHOLE POLYMER FOAM APPLICATIONS

(75) Inventors: Carlos Abad, Kingswells (GB); Alexander Wilson, Hardwick (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 359 days.

(21) Appl. No.: 13/544,515

(22) Filed: Jul. 9, 2012

(65) Prior Publication Data

US 2013/0098622 A1    Apr. 25, 2013

Related U.S. Application Data

(60) Provisional application No. 61/571,995, filed on Jul. 8, 2011.

(51) Int. Cl.
| | | |
|---|---|---|
| *E21B 43/25* | (2006.01) | |
| *E21B 43/267* | (2006.01) | |
| *E21B 43/16* | (2006.01) | |
| *C09K 8/38* | (2006.01) | |
| *C09K 8/518* | (2006.01) | |
| *C09K 8/536* | (2006.01) | |
| *C09K 8/70* | (2006.01) | |
| *C09K 8/94* | (2006.01) | |

(52) U.S. Cl.
CPC .............. *E21B 43/166* (2013.01); *C09K 8/38* (2013.01); *C09K 8/518* (2013.01); *C09K 8/536* (2013.01); *C09K 8/703* (2013.01); *C09K 8/94* (2013.01); *E21B 43/267* (2013.01)

(58) Field of Classification Search
CPC ..... E21B 43/24; E21B 43/166; E21B 43/267; E21B 43/164; C09K 8/38; C09K 8/518; C09K 8/703; C09K 8/94
See application file for complete search history.

(56) References Cited

U.S. PATENT DOCUMENTS

| | | | |
|---|---|---|---|
| 2,029,478 A | 2/1936 | Haines | |
| 3,937,283 A | 2/1976 | Blauer et al. | |
| 5,129,457 A | 7/1992 | Sydansk | |
| 5,360,558 A | 11/1994 | Pakulski et al. | |
| 5,706,895 A * | 1/1998 | Sydansk | 166/294 |
| 5,990,052 A | 11/1999 | Harris | |
| 6,192,985 B1 | 2/2001 | Hinkel et al. | |
| 2005/0020454 A1 * | 1/2005 | Francini et al. | 507/203 |
| 2005/0045334 A1 | 3/2005 | Hayes | |
| 2006/0166836 A1 | 7/2006 | Pena et al. | |
| 2006/0178276 A1 | 8/2006 | Pena et al. | |
| 2007/0044965 A1 | 3/2007 | Middaugh et al. | |
| 2007/0107897 A1 | 5/2007 | Dahanayake et al. | |
| 2007/0215355 A1 | 9/2007 | Shapovalov et al. | |
| 2007/0235189 A1 | 10/2007 | Milne et al. | |
| 2007/0238624 A1 | 10/2007 | Li et al. | |
| 2007/0249505 A1 | 10/2007 | Dahayanake et al. | |
| 2007/0272409 A1 * | 11/2007 | Growcock | 166/278 |
| 2009/0151952 A1 * | 6/2009 | Walton | 166/305.1 |

OTHER PUBLICATIONS

Shen et al. CO2 Solubility of Oligomers and Polymers that Contain the Carbonyl Group; Polymer 44 (2003) 1491-1498.
International Search Report and Written Opinion dated Jan. 30, 2013 and issued in International Application No. PCT/US2012/045941 filed Jul. 9, 2012 (8 pages).

* cited by examiner

*Primary Examiner* — Zakiya W Bates
(74) *Attorney, Agent, or Firm* — Jeremy D. Tillman (57) ABSTRACT

A method of treating a subterranean formation penetrated by a wellbore by contacting an energized fluid with the subterranean formation; and reducing a partial pressure of the energized fluid by an amount sufficient to form polymeric foam structure within the subterranean formation.

18 Claims, 3 Drawing Sheets

DOWNHOLE POLYMER FOAM APPLICATIONS

PRIORITY

The present application claims priority to U.S. Provisional Application No. 61/571,995 filed Jul. 8, 2011, which is incorporated by reference herein in its entirety.

BACKGROUND

Hydrocarbons (oil, natural gas, etc.) are obtained from a subterranean geologic formation (a "reservoir") by drilling a well that penetrates the hydrocarbon-bearing formation. In the process of recovering hydrocarbons from subterranean formations, it is common practice to treat a hydrocarbon-bearing formation with a pressurized fluid to provide flow channels, i.e., to fracture the formation, or to use such fluids to transport and place proppant to facilitate flow of the hydrocarbons to the wellbore. It is also a common practice to stabilize sand prone formations by means of consolidation treatments, or gravel packing treatments.

Well treatment fluids, particularly those used in fracturing, may comprise a water or oil based fluid incorporating a thickening agent, normally a polymeric material. Gases, such as carbon dioxide ($CO_2$), may be used to fracture alone or in combination with nitrogen ($N_2$) to place the proppant. Foamed materials have been employed in many different applications, such as, for example isolation (polystyrene, or polyurethane), or even structural (aluminum foam in aircraft plans). However, foamed materials in the oilfield are often associated to the use of an energizing gas such as nitrogen ($N_2$), methane or $CO_2$ in aqueous polymeric solutions such as foamed fracturing fluids, or particle slurries, such as foamed cement.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, the present disclosure describes a method of treating a subterranean formation penetrated by a wellbore by contacting an energized fluid with the subterranean formation; and reducing a partial pressure of the energized fluid by an amount sufficient to form polymeric foam structure within the subterranean formation

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if a specific data points within the range, or even no data points within the range, are explicitly identified or refer to a few specific, it is to be understood that inventors appreciate and understand that any conceivable data point within the range is to be considered to have been specified, and that inventors possessed knowledge of the entire range and each conceivable point and sub-range within the range.

The present disclosure relates generally to a method of treating a subterranean formation penetrated by a wellbore by contacting an energized fluid with the subterranean formation; and reducing a partial pressure of the energized fluid by an amount sufficient to form polymeric foam structure within the subterranean formation. For example, the energized fluid may be introduced, injected or conveyed into a subterranean formation by way of a wellbore that penetrates a subterranean formation, such as a water-bearing subterranean formation.

The subject matter of the present application also relates to well servicing methods that may be applied at any time in the life cycle of a reservoir or field to enhance the value of oil and gas assets through reduced water handling cost, improved hydrocarbon productivity and/or higher recovery factors. As used herein, the term "field" includes land based (surface and sub-surface) and sub-seabed applications. The term "oilfield," as used herein, includes hydrocarbon oil and gas reservoirs, and formations or portions of formations where hydrocarbon oil and gas are expected but may ultimately contain water, brine, or some other composition.

As discussed above, the energized fluid may be contacted with the subterranean formation, such as, for example, with a surface of the subterranean formation and/or wellbore. For purposes of this disclosure, the term "energized fluid" or "foam" is understood to comprise a fluid which when subjected to a low pressure environment liberates or releases gas from solution or dispersion (for example, a liquid containing dissolved gases) as known in the art. Foam or energized fluids are stable mixture of gases and liquids that form a two-phase system. Foam and energized fracturing fluids are generally described by their foam quality, i.e. the ratio of gas volume to the foam volume. If the foam quality is between 52% and 95%, the fluid is usually called foam. Above 95%, foam is generally changed to mist. In the present patent application, the term "energized fluid" also refers to any stable mixture of gas and liquid, regardless of the foam quality.

Aspects of the subject matter described herein include energized fluids comprising any of:

(a) Liquids that at bottom hole conditions of pressure and temperature are close to saturation with a species of gas. For example the liquid can be aqueous and the gas nitrogen or carbon dioxide. Associated with the liquid and gas species and temperature is a pressure called the bubble point, at which the liquid is fully saturated. At pressures below the bubble point, gas emerges from solution;

(b) Foams, consisting generally of an aqueous phase and a gas phase, or a solid phase and a gas phase. At high pressures the foam quality is typically low (i.e., the non-saturated gas volume is low), but quality (and volume) rises as the pressure falls. Additionally, the aqueous phase may have originated as a solid material and once the gas phase is dissolved into the solid phase, the viscosity of solid material is decreased such that the solid material becomes a liquid; or (c) Liquefied gases.

Fluid technologies incorporating a gaseous component or a supercritical fluid to form an energized fluid are described in U.S. Pat. Nos. 2,029,478, 3,937,283, 6,192,985 and U.S. Patent Publication Nos. 20060178276, 20060166836, 20070238624, 20070249505, 20070235189, 20070215355, 20050045334 and 20070107897, each of which are incorporated by reference herein in their entirety.

In embodiments, the energized fluid is comprised of a gas component and a polymer component. The gas component may be mixed with and/or partially dissolved in the gas component. The gas component of the energized fluid may be, for example, nitrogen, air, argon, carbon dioxide, helium, krypton, xenon, natural gas, methane, ethane, propane, and any mixtures thereof. The energized fluids that may be used within aspects of the present application include any stable mixture of gas phase and liquid phase. More preferably the gas component comprises carbon dioxide, in any quality readily available. The gas component may assist in the clean-up process of the treated formation. The energized fluid may contain from about 10% to about 90% volume gas component based upon total fluid volume percent, preferably from about 30% to about 80% volume gas component based upon total fluid volume percent, and more preferably from about 40% to about 70% volume gas component based upon total fluid volume percent.

In the foregoing, the characteristics of supercritical fluids such as those described in the present application are exemplified by describing the properties of supercritical carbon dioxide. The below description of the supercritical characteristics of carbon dioxide should not be considered as limiting the scope of the below embodiments only to carbon dioxide, but also encompass all of the gas components of the application.

Supercritical carbon dioxide is a fluid state of carbon dioxide where it is held at or above its critical temperature and critical pressure. Carbon dioxide usually behaves as a gas in air at standard temperature and pressure (STP), or as a solid called dry ice when frozen. If the temperature and pressure are both increased from STP to be at or above the critical point for carbon dioxide, it can adopt properties somewhere between a gas and a liquid. In other words, it behaves as a supercritical fluid above its critical temperature (31.1 degC) and critical pressure (72.9 atm/7.39 MPa), expanding to fill its container like a gas but with a density like that of a liquid.

As used herein, the term "critical point" refers to the vapor-liquid critical point of a material, above which distinct liquid and gas phases do not exist.

Figure 6:
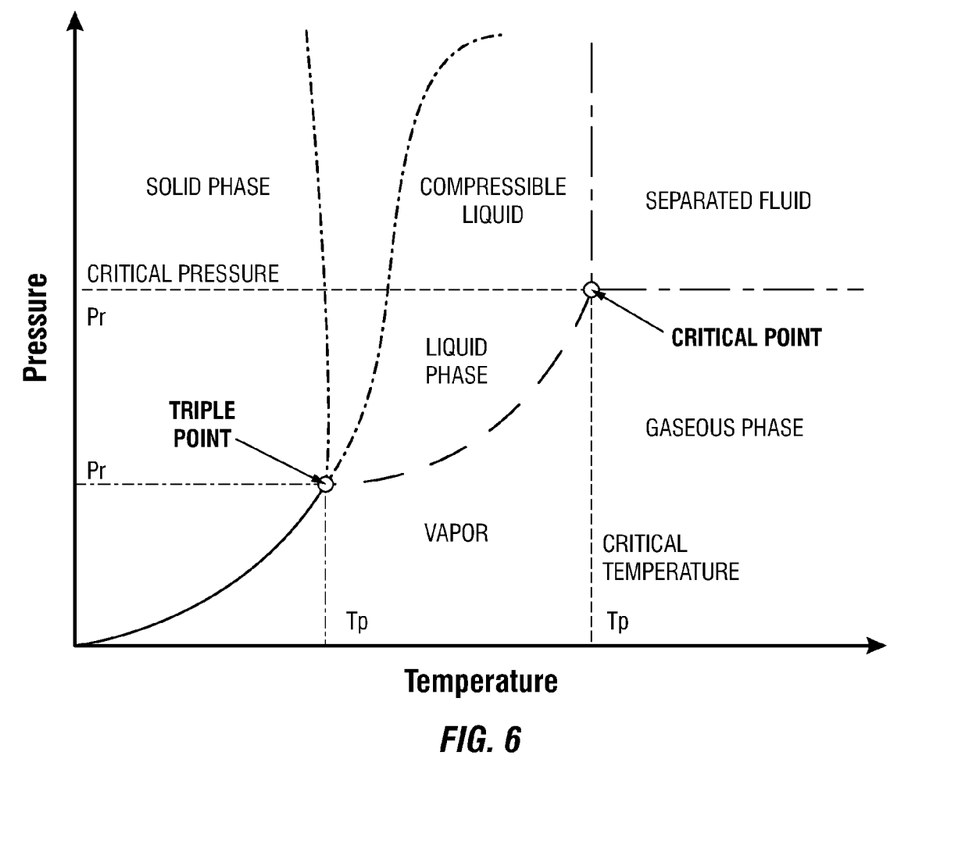
FIG. 6 is a phase diagram.

As shown in the phase diagram in FIG. 6, the critical point is point at which the phase boundary between liquid and gas terminates. In water, the critical point occurs at around 647 degK (374 degC; 705 degF critical temperature) and 22.064 MPa (3200 PSIA or 218 atm, critical pressure), in carbon dioxide occurs at around 303.4 degK (31.1 degC, 88 degF, critical temperature) and 7.39 MPa (1070 PSIA or 72.9 atm, critical pressure), As a substance approaches critical temperature, the properties of its gas and liquid phases converge, resulting in only one phase at the critical point: a homogeneous supercritical fluid. Furthermore, the heat of vaporization is zero at and beyond this critical point, and thus no distinction exists between the two phases. Above the critical temperature, a liquid typically cannot be formed by an increase in pressure, even though a solid may be formed under sufficient pressure. The critical pressure is the vapor pressure at the critical temperature. Above the critical point the solubilizing properties of the substance or mixture can be significantly different from those of the liquid or gas phases. Table 1 below specifies the critical temperature and critical pressure for some of the gas component mentioned above, and some other examples.

TABLE 1

Critical Temperature and Critical Pressure of Gas Components

| Substance | Critical temperature | Critical pressure (absolute) |
|---|---|---|
| Argon | −122.4° C. (150.8 K) | 48.1 atm (4,870 kPa) |
| Ammonia | 132.4° C. (405.6 K) | 111.3 atm (11,280 kPa) |
| Bromine | 310.8° C. (584.0 K) | 102 atm (10,300 kPa) |
| Chlorine | 143.8° C. (417.0 K) | 76.0 atm (7,700 kPa) |
| Ethanol | 241° C. (514 K) | 62.18 atm (6,300 kPa) |
| Fluorine | −128.85° C. (144.30 K) | 51.5 atm (5,220 kPa) |
| Helium | −267.96° C. (5.19 K) | 2.24 atm (227 kPa) |
| Hydrogen | −239.95° C. (33.20 K) | 12.8 atm (1,300 kPa) |
| Krypton | 63.8° C. (209.4 K) | 54.3 atm (5,500 kPa) |
| $CH_4$ (Methane) | −82.3° C. (190.9 K) | 45.79 atm (4,640 kPa) |
| Neon | −228.75° C. (44.40 K) | 27.2 atm (2,760 kPa) |
| Nitrogen | 146.9° C. (126.3 K) | 33.5 atm (3,390 kPa) |
| Oxygen | 118.6° C. (154.6 K) | 49.8 atm (5,050 kPa) |
| $CO_2$ | 31.04° C. (304.19 K) | 72.8 atm (7,380 kPa) |
| $N_2O$ | 36.4° C. (309.6 K) | 71.5 atm (7,240 kPa) |
| Xenon | 16.6° C. (289.8 K) | 57.6 atm (5,840 kPa) |
| Water | 100.0° C. (303.4 K) | 218 atm (22,064 kPa) |

The polymer component may be dissolved in the gas component under supercritical conditions. The dissolution may occur with or without mixing. The supercritical conditions vary depending on the gas component or the components of a gas mixture. However, as used herein, the phrase "supercritical conditions" refers to the conditions required to reach a state that does not have any distinct liquid, solid or gas phases. As a material approaches critical temperature and/or critical pressure, the properties of its gas and liquid phases converge, resulting in only single phase at the critical point (also referred to as a homogeneous supercritical fluid). Such conditions typically occur by increasing the temperature and pressure of the material above its critical point. At these conditions, the material can effuse through solids like a gas or dissolve materials like a liquid. Furthermore, at conditions close to the critical point, subtle changes in the temperature and/or pressure of the material can result in significant changes in a material's physical property, such as density, and thus allowing many properties of a supercritical fluid to be "fine-tuned".

As discussed above, the polymer component may be swollen or plasticized by a gas component at supercritical conditions. This may form a relatively low viscosity slurry, which may also contain a catalyst used to set the polymer if the choice is a reactive. Examples of catalysts include acids, bases, metals, amines, anhydrides, carboxylic acids, sulfur, mercaptanes, alcohols, and the like. The use of such catalysts may enable high strength and high resistance foam to be formed downhole after the gas component has been released. If present, the amount of catalyst in the composition may be from about 0.001% to about 5%, from about 0.1% to about 5%, from about 0.5% to about 4.0%, from about 1.0% to about 2.5% and form about 1.0% to about 2.0%, based on polymer weight.

A catalyst may also be used to crosslink the thermoplastic solids. In particular embodiments the energized fluid may also be a solids laden slurry comprising one or more inorganic and/or organic solids that may become part of the foam upon polymerization of the polymer component in the energized fluid. Examples of inorganic solids may be ceramics, sand, bauxite, glass beads, metal beads, and the like. Examples of organic solids may be thermoplastic pellets or beads, thermoset pellets or beads, wood chips, and the like. Solids such as those described below can be added to the slurry in a high pressure conveyor such as an extruder or high pressure pump, and can be transported with the slurry. In another embodiment the solids may be extruded together with the thermoplastic polymer prior to the addition of the gas component in the form of pellets. In another embodiment the inorganic solids, such as sand, bauxite or ceramics are coated with polymer resins. In another embodiment the solids may be slurried with the polymer resin. A conductive path results from the evaporation of the gas component in the polymer.

In another embodiment, the thermoplastic polymer or the thermoset produced downhole may be etched or wormholed with an acid or oxidizer treatment after the main foam treatment is completed. Examples of acids include hydrochloric acid, formic acid, acetic acid, mud acid, citric acid, nitric acid, sulfuric acid, hydrofluoric acid, and other compounds capable of generating such acids, such as organic esters, or ammonium bifluoride. Examples of oxidizers include persulfates such as ammonium, sodium, or potassium persulfate, bromides, organic peroxides, organic peresters, and the like. The amount of the acid and/or oxidizer may be present in the composition in an amount of from about 0.01% to about 5%, from about 0.5% to about 4.0%, from about 1.0% to about 2.5% and form about 1.0% to about 2.0% based on polymer weight.

The viscosity that can be achieved with such supercritical fluid polymeric solutions may be reduced unless high concentrations of the polymer component are considered. For example, the concentration of the polymer component may be from about 0.1% to about 20%, from about 0.5% to about 20%, from about 1.0% to about 15% and form about 5.0% to about 10.0% based upon the weight of the energized fluid. On the other hand, only a select amount of polymers have been found to date to dissolve in a gas component, such as $CO_2$, at concentrations significant enough to generate viscosity. The solubility of many of those polymers that dissolve in the gas component is only significant for low molecular weight polymers and oligomers, such as, for example, polymer and oligomers having a molecular weight of from about 100 Daltons to about 100,000 Dalton or from about between 500 Daltons and 30,000 Daltons.

In another aspect of the application, the gas or gas mixture in supercritical conditions becomes a solvent for the polymer. The description of the supercritical component as a solvent is based on the fact that complete polymer solubility is not always required in the disclosed wellbore applications, and thus it will suffice with the gas component "swelling" the polymers, oligomers and copolymers. As used herein, the term "swell" does not necessarily imply the use of a fully dissolved crosslinked polymer that is solvated completely and at a molecular level dissolves perfectly in the solvent, but rather, a polymer that is not fully dissolved, but rather plasticized, and whose hydrodynamic volume may not necessarily increase in the presence of the gas component, and therefore is only "swollen" by the solvent, and not "dissolved". In some embodiments the term "swell" will be used indistinctly from the term "plasticize". This term may apply to those polymers or oligomer that, at the pressure and temperature of the experiment or treatment, do not completely dissolve in the gas component, but show significant compatibility with the solvent, so as to allow gas component molecules to permeate, and "plasticize" the polymer matrix.

As defined herein, the term "polymer" or "polymer component" refers to both high molecular weight polymers (and oligomers) and low molecular weight polymers (and oligomers), both linear, branched, star, crosslinked, dendrimeric.

The polymer component may be a reactive polymer, such as, for example, an epoxy resin, a phenoxy resin, a phenol formaldehyde resin, a melamine formaldehyde resin, a polysiloxane, a reactive polyester resin, and combinations thereof. The polymer component may also be a thermoplastic non-reactive polymer such as, for example, polyvinyl acetate and copolymers, polylactic acid, perfluoroacrylate (PFA), polyglycolic acid, polyhydroxybutyrate, bisphenol A (acetone) polycarbonate, bisphenol F (formaldehyde) polycarbonate, polymethyl acrylate and similar polymers, polymethyl methacrylate and similar polymers, polyethylene carbonate, polyethylene and copolymers, polypropylene and copolymers, polystyrene and copolymers, polyoxymethylene and copolymers and combinations thereof.

The polymer component may comprise one or more polymers, such as for example, from about 2 to about 5 different polymer materials. For example, the polymer component may be a mixture of polyvinyl acetate and polymethyl methacrylate. The two polymers, if the energized composition contains two polymers, may be present in any suitable amount, such as, for example from about 1 wt % first polymer to about 99 wt % second polymer, from about 10 wt % first polymer to about 90 wt % second polymer, from about 25 wt % first polymer to about 75 wt % second polymer, from about 50 wt % first polymer to about 50 wt % second polymer and from about 40% first polymer to about 60 wt % second polymer, based upon the total polymer weight in the energized fluid. Any of the polymers discussed above may be considered as the first or second polymers if the two polymers are present in the energized fluid.

The gas component may also be used as a carrier for a solid polymer component or even as a filler for other materials such thermoplastic fibers, beads, sand, salts, metal beads and fibers. Such a solid material may or may not be in a treatment.

The energized fluid may also comprises an inorganic solid slurry, a swollen polymer matrix, or a swollen polymer and inorganic solid slurry such where the gas component is selected as the solvent form the foam. Moreover, it may be appropriate that, as the solvent volatilizes, the desired polymer solution viscosity is maintained, or the desired polymer melt strength at downhole temperature and pressure conditions is properly managed. This rheological characteristic of the polymer supercritical gas mixture is referred to herein as "melt viscosity". A suitable "melt viscosity" may be achieved by (1) a selection of the polymer component and the gas component, (2) by a selection of the polymer and inorganic solid concentration with respect to the gas component, (3) a selection of the polymer molecular weight or (4) a selection of the crosslinker concentration. Too low (i.e., below about 1000 cP) of a "melt viscosity" may result in the gas component easily escaping the fluid, and not resulting in an expanded foam contacting properly the formation. Too high of a "melt viscosity" (i.e., above about 1,000,000 cP) may result in the gas component not being able to escape the fluid, and not resulting in an expanded foam contacting properly the formation. The melt viscosity may be from about 1000 cP to about 1,000,000 cP As discussed above, to induce the supercritical conditions, the partial pressure of the gas component in the energized fluid (or the energized fluid itself) may be increased by at least 900 psi (6,205.28 kPa), at least 1500 psi (10,342.14 kPa), at least about 2000 psi (13,789.51 kPa), at least about 2500 psi or at least about 3000 psi. The partial pressure of the gas component in the energized fluid (or the energized fluid itself) may also be increased to a pressure that is at least 900 psi (6,205.28 kPa), at least 1500 psi (10,342.14 kPa), at least about 2000 psi (13,789.51 kPa), at least about 2500 psi (17,236.89 kPa) or at least about 3000 psi (20,684.27 kPa) greater than the critical pressure of the gas component. This increase in pressure may occur before, during (simultaneously with) or after the energized fluid composition is contacted with the subterranean formation. The polymer solubilization or swelling is achieved by ensuring sufficient partial pressure of the solubilizing supercritical gas is provided. In some embodiments, the introduction of an additional gas component that may not be an acceptable solvent for the polymer under supercritical conditions may result in a need to increase the partial pressure of the solubilizing supercritical gas, beyond what would be needed if a single gas component would be used. Thus, one having skill in the art would understand that in order to achieve the polymer solubilization or swelling required for the application disclosed an "effective partial pressure" of the gas component in the energized fluid is required. Conversely, in order to de-swell, of solidity the polymer solution, a reduction in the effective partial pressure of the gas component in the energized fluid is required.

In embodiments, the effective partial pressure of the supercritical gas in the subterranean formation is reduced by an amount sufficient to de-swell or solidify the polymer and to form a polymeric foam structure within the subterranean formation due to the release of the supercritical solvent in the form of gas. This polymeric foam structure may be entirely solid or only partially solid depending upon the amount of pressure reduction. The polymeric foam structure may also be referred to as a solid open-cell foam structure. For example, the amount the pressure is reduced depends upon the gas component. For example, if the gas component is carbon dioxide, the pressure of the subterranean formation may be reduced to below about 1000 psi (6894.76 kPa) or below about 400 psi (2757.90 kPa), such as form example, below about 350 psi (2413.17 kPa) or below about 300 psi (2068.43 kPa). The effective partial pressure of the supercritical gas in the subterranean formation may be reduced by any acceptable method, such as, for example, decreasing the total wellhead pressure by manipulating the valves and/or fitting located on top of the well casing (i.e., Christmas tree) that control the production rate of hydrocarbon fluid, by introducing a vacuum or a pump, by introducing into the wellbore a lower density fluid, or by diluting downhole the solving supercritical gas concentration with a non-swelling gas.

As discussed above, a polymeric open cell foams may be formed downhole in the subterranean formation. Such a foam can be designed to be capable of sustaining the static closure stress of some formations, such as, for example, shallow formations, coalbed, or shale reservoirs, and the like, and therefore be used as a proppant or proppant less fracturing fluid. Also, such a foam may be used to fill the space between an open hole and a screen as used in sand control treatments or to consolidate near wellbore regions in sanding prone reservoirs. Also such foam may be used to partially fill the pore space in the near wellbore region of a formation to consolidate said formation in sanding prone reservoirs. Also during drilling in situations where mud losses are found (loss circulation), such foam may be used to partially fill the void space in the drilled section to prevent further mud loses.

Embodiments may also include proppant particles that are substantially insoluble in the fluids of the formation. Proppant particles carried by the treatment fluid remain in the fracture created, or in the wellbore, or in the annular space between a wellbore and a screen in sand prone formations, thus propping open the fracture when the fracturing pressure is released and the well is put into production, or keeping the wellbore face stable when the well is put into production in sand prone formations. Suitable proppant materials include, but are not limited to, sand, walnut shells, sintered bauxite, glass beads, ceramic materials, naturally occurring materials, or similar materials. Mixtures of proppants can be used as well. If sand is used, it may be from about 20 to about 100 U.S. Standard Mesh in size. With synthetic proppants, mesh sizes about 8 or greater may be used. Naturally occurring materials may be underived and/or unprocessed naturally occurring materials, as well as materials based on naturally occurring materials that have been processed and/or derived. Suitable examples of naturally occurring particulate materials for use as proppants include: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particulation, processing, etc. Further information on nuts and composition thereof may be found in ENCYCLOPEDIA OF CHEMICAL TECHNOLOGY, Edited by Raymond E. Kirk and Donald F. Othmer, Third Edition, John Wiley & Sons, vol. 16, pp. 248-273, (1981).

The concentration of proppant in the fluid can be any concentration known in the art. For example, the concentration of proppant in the fluid may be in the range of from about 0.03 to about 3 kilograms of proppant added per liter of liquid phase. Also, any of the proppant particles can further be coated with a resin to potentially improve the strength, clustering ability, and flow back properties of the proppant.

A fiber component may be included in the fluids to achieve a variety of properties including improving particle suspension, and particle transport capabilities, and gas phase stability. Fibers used may be hydrophilic or hydrophobic in nature. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids, the fiber component may be included at concentrations from about 1 to about 15 grams per liter of the liquid phase of the fluid, such as a concentration of fibers from about 2 to about 12 grams per liter of liquid, or from about 2 to about 10 grams per liter of liquid.

Embodiments may further use fluids containing other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, alcohol stabilizers, scale inhibitors, corrosion inhibitors, fluid-loss additives, bactericides and biocides such as 2,2-dibromo-3-nitrilopropionamine or glutaraldehyde, and the like. Also, they may include a co-surfactant to optimize viscosity or to minimize the formation of stable emulsions that contain components of crude oil.

As used herein, the term "alcohol stabilizer" is used in reference to a certain group of organic molecules substantially or completely soluble in water containing at least one hydroxyl group, which are susceptible of providing thermal stability and long term shelf life stability to aqueous zirconium complexes. Examples of organic molecules referred as "alcohol stabilizers" include but are not limited to methanol, ethanol, n-propanol, isopropanol, n-butanol, tert-butanol, ethyleneglycol monomethyl ether, and the like.

The energized fluids of the present disclosure may be suitable for use in numerous subterranean formation types. For example, formations for which sealing with the energized fluids of the present disclosure may be used include sand, sandstone, shale, chalk, limestone, and any other hydrocarbon bearing formation.

The portion of the wellbore through which the energized is injected into the treated zone can be open-hole (or comprise no casing) or can have previously received a casing. If cased, the casing is desirably perforated prior to injection of the energized fluid. Optionally, the wellbore can have previously received a screen. If it has received a screen, the wellbore can also have previously received a gravel pack, with the placing of the gravel pack optionally occurring above the formation fracture pressure (a frac-pack).

Techniques for injection of fluids with viscosities similar to those of the energized fluids of the present disclosure are well known in the art and may be employed with the methods of the present disclosure. For example, known techniques may be used in the methods of the present disclosure to convey the energized fluids of the present disclosure into the subterranean formation to be treated.

In embodiments, the energized fluid may be driven into a wellbore by a pumping system that pumps one or more energized fluids into the wellbore. The pumping systems may include mixing or combining devices, wherein various components, such as fluids, solids, and/or gases maybe mixed or combined prior to being pumped into the wellbore. The mixing or combining device may be controlled in a number of ways, including, but not limited to, using data obtained either downhole from the wellbore, surface data, or some combination thereof. Methods of this disclosure may include using a surface data acquisition and/or analysis system, such as described in U.S. Pat. No. 6,498,988, incorporated herein by reference in its entirety. In embodiments, one or more energized may be pumped into the wellbore after detecting an unacceptable amount of water or other condition has been detected. Specific embodiments may comprise sealing the zone of interest (which may be where an unacceptable amount of water or other condition has been detected) using the energized fluid optionally with packers, such as straddle cup packers. Packers or similar devices can be used to control flow of the energized fluid into the subterranean formation for which sealing is desired.

In embodiments, the energized fluid may be injected into the subterranean formation at a pressure less than the fracturing pressure of the formation. For example, the energized fluids will be injected below the formation fracturing pressure of the respective formation.

The volume of energized fluids to be injected into subterranean formation is a function of the subterranean formation volume to be treated and the ability of the energized fluid of the present disclosure to penetrate the subterranean formation. The volume of energized fluid to be injected can be readily determined by one of ordinary skill in the art. As a guideline, the formation volume to be treated relates to the height of the desired treated zone and the desired depth of penetration. In embodiments, the depth of penetration of the energized fluid may be at least about 15 cm from the outer wall of the wellbore into the subterranean formation, such as the depth of penetration of at least about 30 cm from the outer wall of the wellbore.

The ability of the energized fluid to penetrate the subterranean formation depends on the permeability of the subterranean formation and the viscosity of the energized fluid. In embodiments, the viscosity of the energized fluid is sufficiently low as to not slow penetration of the consolidating fluid into the subterranean formation. In a low-permeability subterranean formation, the viscosity of the energized fluid is sufficiently low as to not slow penetration of the consolidating fluid into the subterranean formation. For example, in a low-permeability subterranean formation, suitable initial viscosities may be similar to that of water, such as from about from about 1 cP to about 10,000 cP, or be from about 1 cP to about 1,000 cP, or be from about 1 cP to about 100 cP at the treating temperature, which may range from a surface temperature to a bottom-hole static (reservoir) temperature, such as from about 4° C. to about 80° C., or from about 10° C. to about 70° C., or from about 25° C. to about 60° C., or from about 32° C. to about 55° C.

The above embodiments described for wellbore applications for various foamed fluids in one or more well service applications such as, for example, fracturing applications, wellbore consolidation, and eventually other reservoir optimization applications like conformance control, water control, or enhanced oil recovery. In particular, some embodiments are focused upon polymeric fluids foamed with a gas component that can form a thermoplastic or thermosetting foam downhole. Moreover, other embodiments described placing a foamed fluid downhole (in a fracture, or in a gravel pack) that will, under certain conditions, allow for sufficient permeability for the hydrocarbon to flow to the wellbore.

EXAMPLES

Example 1

Formation of Solid Open-Cell Phone with Polyvinyl Acetate 10 grams of polyvinyl acetate (PVAc) beads were placed in a high pressure high temperature (HPHT) apparatus (approximate volume 250 ml), filled with $CO_2$. The apparatus was brought to a pressure of 1800 psi (12,410 kPa) and a temperature of 40° C., therefore placing the $CO_2$ in a supercritical state. The $CO_2$ was then absorbed by the PVAc polymer as evidenced by the color change from pale to translucent, and then finally to transparent, thus showing compatibility between the $CO_2$ and the polyvinyl acetate.

Figure 1:
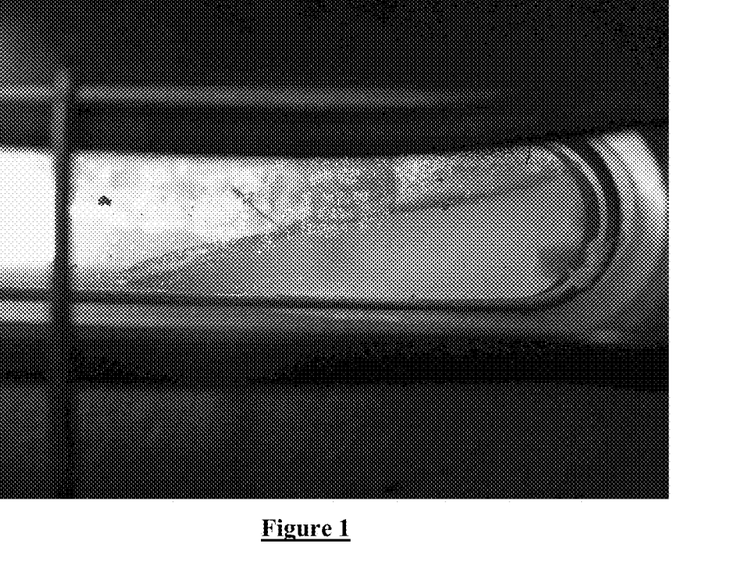
FIG. 1 is a photograph of the energized fluid of Example 1.

The inventor believe that under these conditions, the glass transition temperature ($T_g$) of the polyvinyl acetate is depressed from 30° C. to some lower value by the $CO_2$, and the polymer becomes a mobile high viscosity fluid partially saturated with supercritical $CO_2$, as shown in the photograph represented in FIG. 1. As seen in FIG. 1, the HPHT cell has been rotated onto its side to show the fluid flows under gravity.

Figure 2:
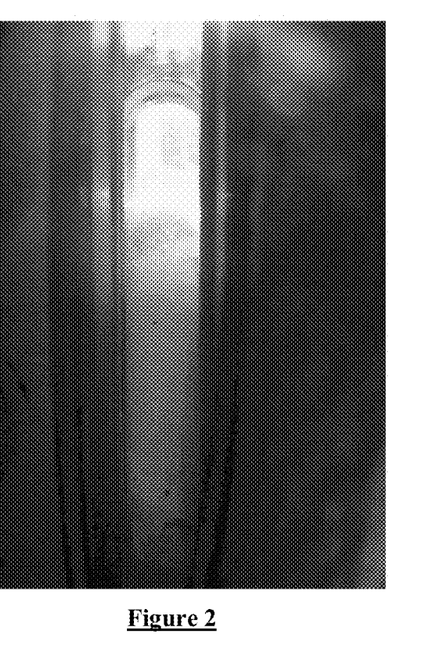
FIG. 2 is a photograph of the polymer foam of Example 1.

No mixing was applied to the sample in Example 1. Thus, a two phase system was obtained comprised of high concentration polymer solution (or plasticized polymer) surrounded by a supercritical $CO_2$ (of density 0.7 g/cm$^3$). The temperature and pressure were not sufficiently high to obtain a fully miscible single phase fluid. The pressure of the system was then reduced to 100 psi (10,000 kPa) (similar to what may happen in a downhole treatment). The $CO_2$ then reverted into a gas phase, "blowing" and expanding the polymer, which formed conductive pathways as the $CO_2$ exited the solution from the polymer. This resulted in a solid open-cell foam, as the $T_g$ returned back to 30° C., as the polymer resolidified, as shown in FIG. 2. We estimated the volume of the expanded foam to be approximately 5 times that of the liquid phase.

Example 2

Formation of PVAc Foam with Sand

Because the present inventors determined that the PVAc foam possessed good adhesive properties as well as high permeability, they decided to perform another experiment by adding added loose sand, (20/40 frac sand) to the polymer/$CO_2$ mix to determine if the foam generated would consolidate the sand.

Figure 3:
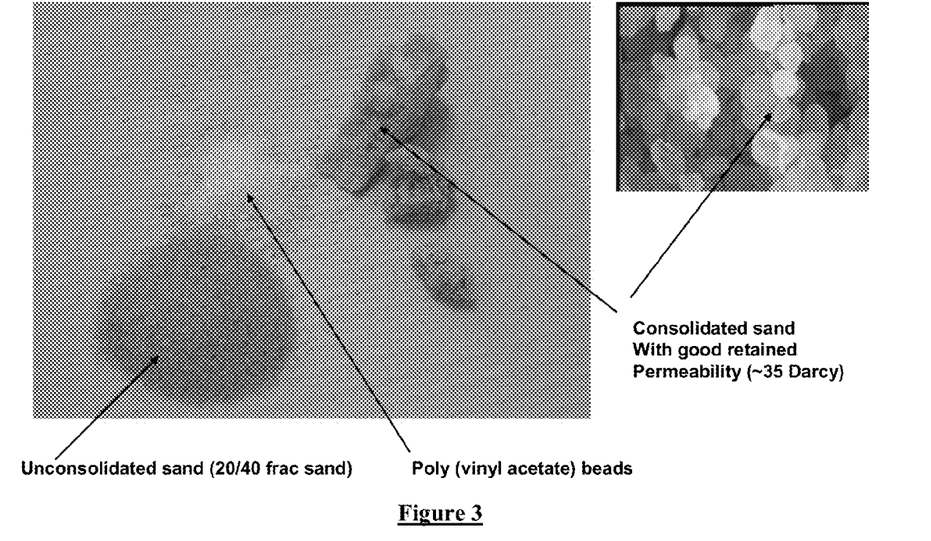
FIG. 3 is a photograph of the polymer foam of Example 2.

A blend of 30 g of PVAc beads with 114 g of 20/40 frac sand was placed into the HPHT cell and heated to 50° C. Then, a pressure of 1500 psi $CO_2$ was applied for 45 minutes. The polyvinyl acetate began to soften and coat the sand when the pressure of $CO_2$ approached 900 psi. After 45 minutes, the cell was slowly de-pressurized. When the pressure of $CO_2$ dropped to 200 psi, the sand/PVAc blend in the cell began to expand as the PVAc started to foam. When the HPHT cell was fully depressurized and dismantled we were left with a block of consolidated sand glued together by solidified PVAc foam, as shown in FIG. 3. A backflow experiment with 2 wt % potassium chloride (KCl) brine indicated the consolidated sand/foam mix had a permeability of approximately 35 Darcy. See FIG. 3.

This experiment demonstrated that the use of this process described in application above may be suitable as a downhole sand-consolidation application and/or an application for binding proppant within the fractures of a subterranean formation.

Example 3

Formation of PMMA Foam with Sand

Figure 4:
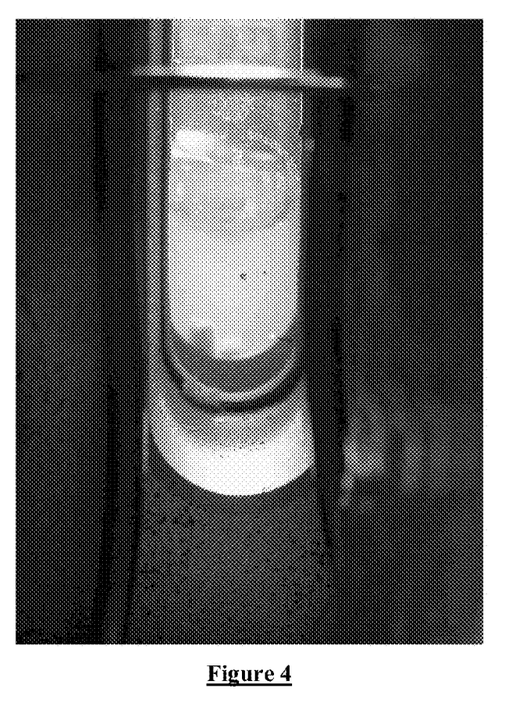
FIG. 4 is a photograph of the polymer foam of Example 3.

In order to see if we could improve upon the temperature resistance and stability of the solid polymeric foam we tried a different polymer, 10 grams of polymethyl methacrylate (PMMA) beads supplied by Sigma Aldrich (having a molecular weight of 15,000 g/mol, a density of 1.188 g/cm$^3$ and glass transition temperature ($T_g$) of 82° C.) were placed in the HPHT apparatus (approximate volume 250 ml), filled with $CO_2$. The apparatus was brought to a pressure of 2000 psi (13790 kPa) and a temperature of 72° C., therefore placing the $CO_2$ in a supercritical state. Similar to PVAc, the PMMA was also partially soluble in supercritical $CO_2$, but formed a much more viscous translucent 'blob' of 'molten' fluid, as shown below in FIG. 4. The present inventors observed that the PMMA formed what appeared to be a two-phase 'molten' fluid, with the 'upper phase' apparently more viscous than the 'lower phase'. At this stage, the present inventors believed that this phenomenon may be an effect of $CO_2$ extraction on the PMMA and it is simply that one of the phases, (possibly the lower phase) that is $CO_2$ rich.

Figure 5:
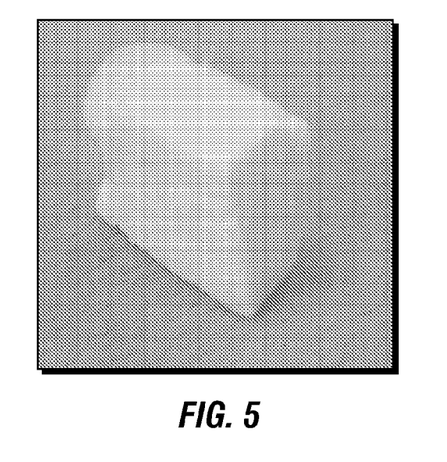
FIG. 5 is a photograph of the polymer foam of Example 3.

After a period of 2 hours at pressure and temperature, the cell was slowly depressurized. As the pressure dropped to 1000 psi we began to see the first (minor) signs of foaming. This continued to increase as the pressure was dropped towards ambient and a solid open-cell expanded foam was formed, as shown in FIG. 5. The PMMA foam was found to be more brittle and friable than the PVAc foam and also began to soften at 60° C. So we had made no improvement to the temperature stability by using this material. We repeated the experiment with a higher molecular weight PMMA (MW=350,000), but this made no improvement to the temperature resistance of the solid foam Another experiment was repeated using a 60:40 mix of PMMA and PVAc, but the results w.r.t temperature stability were the same.

Although only a few example embodiments have been described in detail above, those skilled in the art will readily appreciate that many modifications are possible in the example embodiments without materially departing from the above application entitled "DOWNHOLE POLYMER FOAMS APPLICATIONS". Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method of treating a subterranean formation penetrated by a wellbore, the method comprising:
    contacting an energized fluid with the subterranean formation; and
    reducing a partial pressure of the energized fluid by an amount sufficient to form polymeric foam structure within the subterranean formation.

2. The method of claim 1, wherein the method further comprises:
    forming the energized fluid, the energized fluid comprising at least a polymer component and a gas component.

3. The method of claim 2, wherein the forming further comprises:
    dissolving the polymer in the gas component under super critical conditions, wherein the polymer component and the gas component form a two-phase system.

4. The method of claim 2, wherein the polymer component is a reactive polymer component selected from the group consisting of an epoxy resin, a phenoxy resin, a phenol formaldehyde resin, a melamine formaldehyde resin, a polysiloxane, a reactive polyester resin, and copolymers thereof.

5. The method of claim 2, wherein the polymer component is a thermoplastic non-reactive one component selected from the group consisting of polyvinyl acetate and copolymers, perfluoroacrylate (PFA), polylactic acid, polyglycolic acid, polyhydroxybutyrate, bisphenol A (acetone) polycarbonate, bisphenol F (formaldehyde) polycarbonate, polymethyl acrylate, polymethyl methacrylate, polyethylene carbonate, polyethylene and copolymers, polypropylene and copolymers, polystyrene and copolymers, polyoxymethylene and copolymers, and combinations thereof.

6. The method of claim 2, wherein the polymer component is polyvinyl acetate or polymethyl methacrylate.

7. The method of claim 2, wherein the gas component is selected from the group consisting of nitrogen, air, argon, carbon dioxide, helium, krypton, xenon, natural gas, methane, ethane, propane, and any mixtures thereof.

8. The method of claim 2, wherein the gas component is carbon dioxide.

9. The method of claim 2, wherein the gas component comprises at least carbon dioxide.

10. The method of claim 1, wherein the method further comprises, prior to the contacting, increasing a partial pressure of the energized fluid by at least 900 psi (6,205.28 kPa).

11. The method of claim 10, wherein the increased partial pressure of the energized fluid is at least 1500 psi (10,342.14 kPa).

12. The method of claim 10, wherein the increased partial pressure of the energized fluid is at least 2000 psi (13789.51 kPa).

13. The method of claim 12, wherein the reduced partial pressure of the energized fluid is at least about 1000 psi (6,894.76 kPa).

14. The method of claim 1, wherein the reduced partial pressure of the energized fluid is at least about 400 psi (2,757.90 kPa).

15. The method of claim 1, wherein the fluid comprises a solids laden slurry.

16. The method of claim 15, wherein the fluid comprises inorganic solids laden slurry.

17. The method of claim 16, wherein the inorganic solids comprises sand or proppant.

18. The method of claim 15, wherein the fluid comprises polymeric solids laden slurry.

* * * * *